(12) United States Patent
Asahi et al.

(10) Patent No.: US 10,498,185 B2
(45) Date of Patent: Dec. 3, 2019

(54) STATOR AND MOTOR

(71) Applicant: Nidec Corporation, Minami-ku, Kyoto (JP)

(72) Inventors: Yu Asahi, Kyoto (JP); Shunsuke Murakami, Kyoto (JP); Takao Atarashi, Kyoto (JP); Masayoshi Maeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 47 days.

(21) Appl. No.: 15/751,186

(22) PCT Filed: Aug. 5, 2016

(86) PCT No.: PCT/JP2016/073185
§ 371 (c)(1),
(2) Date: Feb. 8, 2018

(87) PCT Pub. No.: WO2017/026411
PCT Pub. Date: Feb. 16, 2017

(65) Prior Publication Data
US 2018/0233983 A1    Aug. 16, 2018

(30) Foreign Application Priority Data

Aug. 10, 2015 (JP) ................................. 2015-158393

(51) Int. Cl.
*H02K 3/34* (2006.01)
*H02K 3/48* (2006.01)
(Continued)

(52) U.S. Cl.
CPC ................. *H02K 3/48* (2013.01); *H02K 1/16* (2013.01); *H02K 3/12* (2013.01); *H02K 3/34* (2013.01)

(58) Field of Classification Search
CPC .. H02K 3/12; H02K 3/34; H02K 3/48; H02K 3/522; H02K 1/16
See application file for complete search history.

(56) References Cited

U.S. PATENT DOCUMENTS 6,127,760 A * 10/2000 Nagasaki ............... H02K 1/146
                                                           310/216.074
6,741,009 B1 * 5/2004 Ando ....................... H02K 3/18
                                                              310/215

(Continued)

FOREIGN PATENT DOCUMENTS

JP         H11332139 A      11/1999

*Primary Examiner* — Dang D Le
(74) *Attorney, Agent, or Firm* — Viering, Jentschura & Partner mbB

(57) ABSTRACT

A stator includes an annular core back extending circumferentially around a central axis extending vertically; a plurality of teeth extending radially from the core back; a plurality of insulators covering at least part of the teeth; and a coil formed of a conducive wire wound around the teeth via the insulators. The insulator has a cylinder extending radially, an umbrella disposed radially at an end of the cylinder and extending circumferentially in both sides, and a wall protruding from the outer side surface of the cylinder circumferentially to one side. At least part of a tip surface of the wall is inclined and approaches closer to the cylinder as it moves toward the umbrella in the radial direction. The insulator has at least one protrusion protruding to the core back side from the end of the umbrella in one side of the circumferential direction.

12 Claims, 6 Drawing Sheets

(51) Int. Cl.
*H02K 1/16* (2006.01)
*H02K 3/12* (2006.01)

(56) References Cited

U.S. PATENT DOCUMENTS

| | | | | |
|---|---|---|---|---|
| 7,291,955 | B2* | 11/2007 | Otsuji | H02K 3/325 |
| | | | | 310/194 |
| 8,638,019 | B2* | 1/2014 | Stark | H02K 1/148 |
| | | | | 310/194 |
| 9,209,658 | B2* | 12/2015 | Haga | H02K 3/18 |
| 9,397,527 | B2 | 7/2016 | Haga et al. | |
| 9,496,762 | B2 | 11/2016 | Miyamoto et al. | |
| 2007/0279178 | A1* | 12/2007 | Zimmer | H02K 3/325 |
| | | | | 336/208 |
| 2012/0313477 | A1 | 12/2012 | Haga et al. | |
| 2013/0313939 | A1* | 11/2013 | Hiramitsu | H02K 3/34 |
| | | | | 310/195 |

* cited by examiner

STATOR AND MOTOR

RELATED APPLICATIONS

The present application is a national stage entry according to 35 U.S.C. § 371 of PCT application No.: PCT/JP2016/073185 filed on Aug. 5, 2016, which claims priority from Japanese application No.: 2015-158393 filed on Aug. 10, 2015, is incorporated herein by reference in its entirety.

FIELD OF THE INVENTION

The present disclosure described herein relates to a stator and a motor.

DESCRIPTION OF THE RELATED ART

Motors including a coil wound around teeth via an insulator are known (for example JP 2014-180191).

The above mentioned motor configures a coil by winding a conductive wire around teeth via an insulator. However, when a conductive wire is wound around teeth, the winding start of the conductive wire around the teeth would move in some cases.

In consideration of this point, for example, such a movement of the first winding of the conductive wire can be prevented if the conductive wire is wound over the first winding thereof for its fixation. However, if the conductive wire is initially wound in a position such as a tip of the teeth in an inner rotor, a gap between adjacent teeth in a circumferential direction is narrow, and thus, a space to wrap the conductive wire is difficult to secure. Thus, there has been a technical difficulty in fixing the first winding of the conductive wire by wrapping the conductive wire.

SUMMARY OF THE INVENTION

According to the present disclosure, a stator includes: a core back having an annular shape extending in a circumferential direction around a central axis extending in the vertical direction; a plurality of teeth extending from the core back in a radial direction; a plurality of insulators covering at least part of the teeth; and a coil formed of a conducive wire wound around the teeth via the insulators, wherein the insulator includes a cylinder having a cylindrical shape extending in the radial direction, an umbrella disposed at an end of the cylinder in the radial direction and extending in both sides of the circumferential direction, and a wall protruding from the outer side surface of the cylinder to one side of the circumferential direction, and at least part of a tip surface of the wall is inclined to be closer to the cylinder toward the umbrella in the radial direction, and the insulator includes at least one protrusion protruding to the core back side from the end of the umbrella in one side of the circumferential direction.

According to the present disclosure, a motor includes: the above-mentioned stator; and a rotor that is rotatable relative to the stator.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

Hereinafter, a motor of a preferred embodiment of the present disclosure will be described with reference to accompanying drawings. In the present application, the upper side of a central axis J extending in a vertical direction in FIG. 1 will be referred to as upper side, and the lower side thereof will be referred to as lower side. Note that the vertical direction does not indicate a positional relationship and a direction when the motor is incorporated in an actual device. Furthermore, a direction parallel with the central axis J will be referred to as axis direction, and a radial direction around the central axis J will be referred to as radial direction, and a circumferential direction around the central axis J will be referred to as circumferential direction.

In the present application, a phrase such as extending in an axis direction includes a case where a structural element extends in the axis direction, and a case where a structural element extends in a direction inclined at an angle less than 45 degree with respect to the axis direction. A phrase such as extending in a radial direction includes a case where a structural element extends in the radial direction, that is, a direction orthogonal to the axis direction, and a case where a structural element extends in a direction inclined at an angle less than 45 degree with respect to the radial direction.

Figure 1:
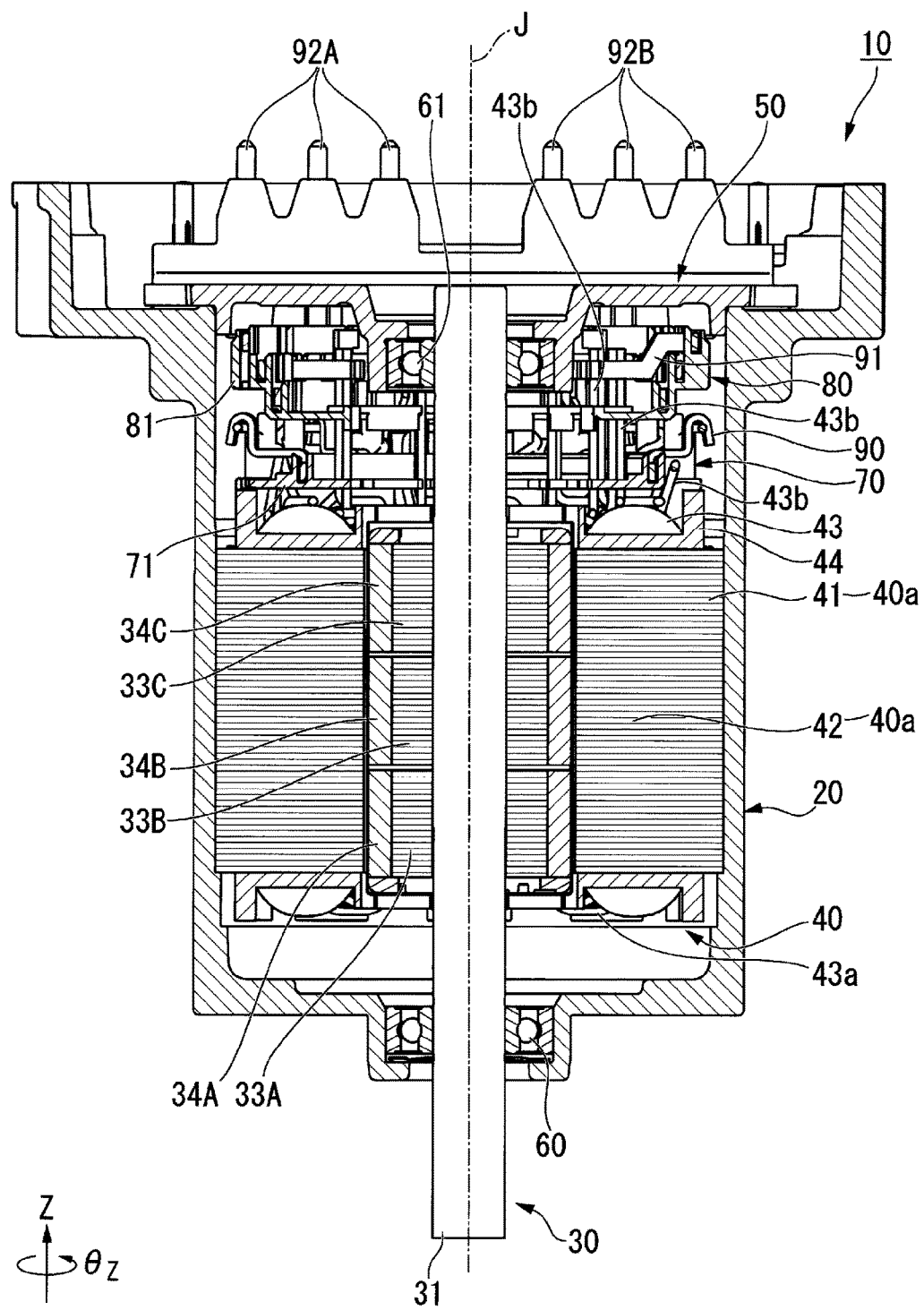
FIG. 1 is a cross-sectional view of a motor of a preferred embodiment.

As shown in FIG. 1, a motor 10 is, for example, an inner rotor motor. The motor 10 includes a housing 20 which can accommodate parts, rotor 30, annular stator 40, bearing holder 50, lower bearing 60 held by the housing 20, upper bearing 61 held by the bearing holder 50, lower side busbar assembly 70, upper side busbar assembly 80, and terminals 92A and 92B.

The rotor 30 includes a shaft 31 disposed along the central axis J, first rotor core 33A, second rotor core 33B, third rotor core 33C, first magnet 34A, second magnet 34B, and third magnet 34C. The shaft 31 is supported rotatably about the central axis J by the lower bearing 60 and the upper bearing 61. The rotor 30 is rotatable with respect to the stator 40 inside the stator 40.

The first core 33A, second rotor core 33B, and third rotor core 33C are annular. The first rotor core 33A, second rotor core 33B, and third rotor core 33C are arranged in this order from the lower side to the upper side in the axis direction. The inner side surfaces of the first rotor core 33A, second rotor core 33B, and third rotor core 33C are, for example, cylindrical around the central axis J. The shaft 31 is fixed to the first rotor core 33A, second rotor core 33B, and third rotor core 33C by, for example, press fitting. Note that the first rotor core 33A, second rotor core 33B, and third rotor core 33C may be indirectly fixed to the shaft 31 via another member.

The first magnet 34A, second magnet 34B, and third magnet 34C are, for example, formed in a plate extending in the circumferential direction. The first magnet 34A is fixed to the outer side surface of the first rotor core 33A. The second magnet 34B is fixed to the outer side surface of the second rotor core 33B. The third magnet 34C is fixed to the outer side surface of the third rotor core 33C.

A plurality of first magnets 34A, second magnets 34B, and third magnets 34C are provided along the circumferential direction. Note that the first magnet 34A, second magnet 34B, and third magnet 34C may be formed as a single member. In that case, the first magnet 34A, second magnet 34B, and third magnet 34C are, for example, cylindrical.

The stator 40 is opposed to the rotor 30 in the radial direction with a gap therebetween. In the preferred embodiment, the stator 40 is disposed outside the rotor 30 in the radial direction. The stator 40 includes a stator core 40a, a plurality of coils 43, and a plurality of insulators 44. The stator core 40a is, for example, a layered structure of a plurality of electromagnetic steel sheets. The stator core 40a includes an annular core back 41 extending in the circumferential direction and a plurality of teeth 42 extending in the radial direction from the core back 41. That is, the stator 40 includes the core back 41 and the teeth 42.

The core back 41 is, for example, a cylinder around the central axis J. The outer peripheral surface of the core back 41 is fixed to the inner peripheral surface of the housing 20 by, for example, press fitting. In the preferred embodiment, the teeth 42 extend inwardly from the inner side surface of the core back 41 in the radial direction. The teeth 42 are arranged at regular intervals in the circumferential direction.

The coil 43 is formed of a conductive wire 43a wound around the teeth 42 via the insulator 44. The coil 43 is arranged on each of the teeth 42. The coil 43 includes a coil end 43b which is an end of the conductive wire 43a. The coil end 43b extends to the upper side from a position where the coil 43 is wound around the teeth 42. At least part of the insulator 44 is disposed between the teeth 42 and the coils 43. The insulator 44 covers at least part of the teeth 42.

The lower side busbar assembly 70 is substantially cylindrical. The lower side busbar assembly 70 is disposed above the stator 40. The lower side busbar assembly 70 includes a neutral point busbar 90 and a substantially cylindrical lower side busbar holder 71 which holds the neutral busbar 90.

The lower side busbar holder 71 is formed of, for example, an insulative resin. The lower side busbar holder 71 is fixed to the insulator 44. The neutral point busbar 90 is electrically connected to the coil 43. Specifically, the neutral point busbar 90 is connected to the coil end 43b. Thus, the neutral point busbar 90 is electrically connected to the stator 40. The neutral point busbar 90 connects a plurality of coil ends 43b as a neutral point.

The upper side busbar assembly 80 is substantially cylindrical. The upper side busbar assembly 80 is disposed above the lower side busbar assembly 70. The upper side busbar assembly 80 includes a phase busbar 91 and an upper side busbar holder 81 holding the phase busbar 91. That is, the motor 10 includes the phase busbar 91 and the upper busbar holder 81.

The upper busbar holder 81 is substantially cylindrical and is formed of, for example, an insulative resin. The upper busbar holder 81 is fixed to the housing 20. The phase busbar 91 is electrically connected to the coil 43. Specifically, the phase busbar 91 is connected to the coil end 43b. The phase busbar 91 is connected to the terminals 92A and 92B. Thus, the phase busbar 91 is electrically connected to the stator 40.

The terminals 92A and 92B are plate-like members extending to the upper side. Ends of the terminals 92A and 92B in the upper side are disposed above the end of the housing 20 in the upper side. The terminals 92A and 92B are connected to an external power source which is not shown.

Figure 2:
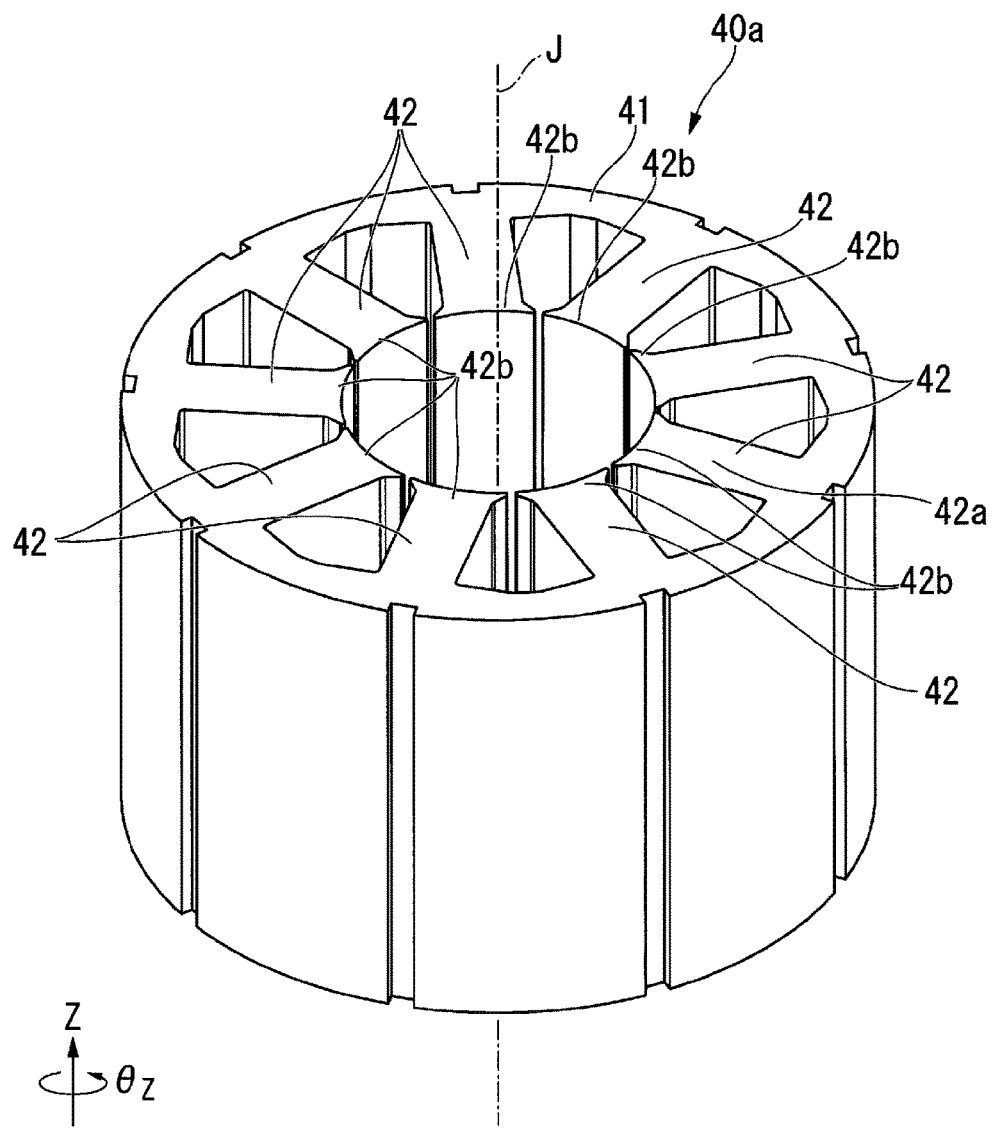
FIG. 2 is a perspective view of a stator core of the preferred embodiment.

As shown in FIG. 2, the teeth 42 include extensions 42a extending inwardly from the inner side surface of the core back 41 in the radial direction and tips 42b protruding from the tips of the extensions 42a in both sides in the circumferential direction. The number of teeth 42 is nine in this example.

Figure 3:
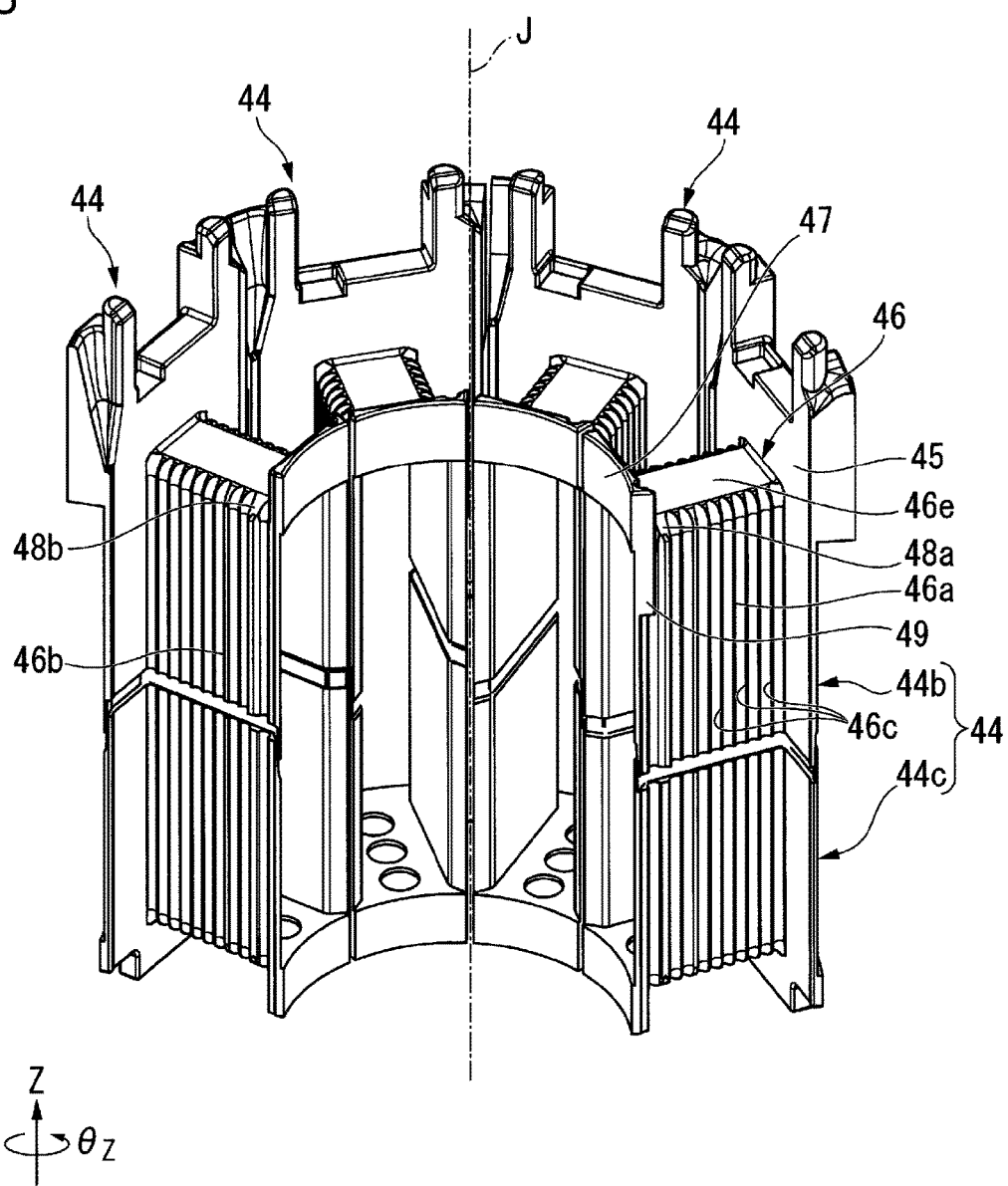
FIG. 3 is a perspective view of part of an insulator of the preferred embodiment.

As shown in FIG. 3, the insulator 44 is annular opening in the both sides in the radial direction. Each insulator 44 is attached to each of the teeth 42. The insulator 44 includes a cylinder 46, umbrella 47, plate 45, walls 48a and 48b, and at least one protrusion 49.

Figure 4:
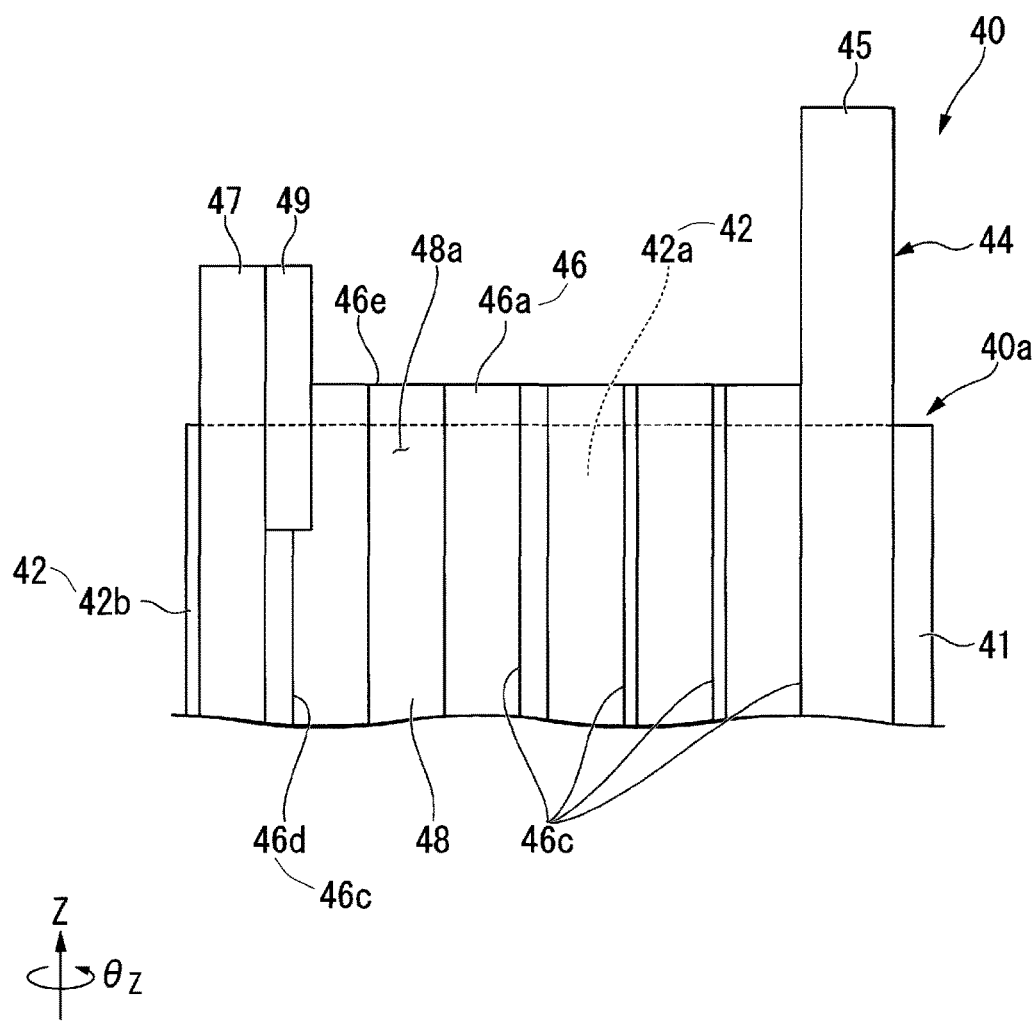
FIG. 4 is a cross-sectional view of part of a stator of the preferred embodiment.
Figure 5:
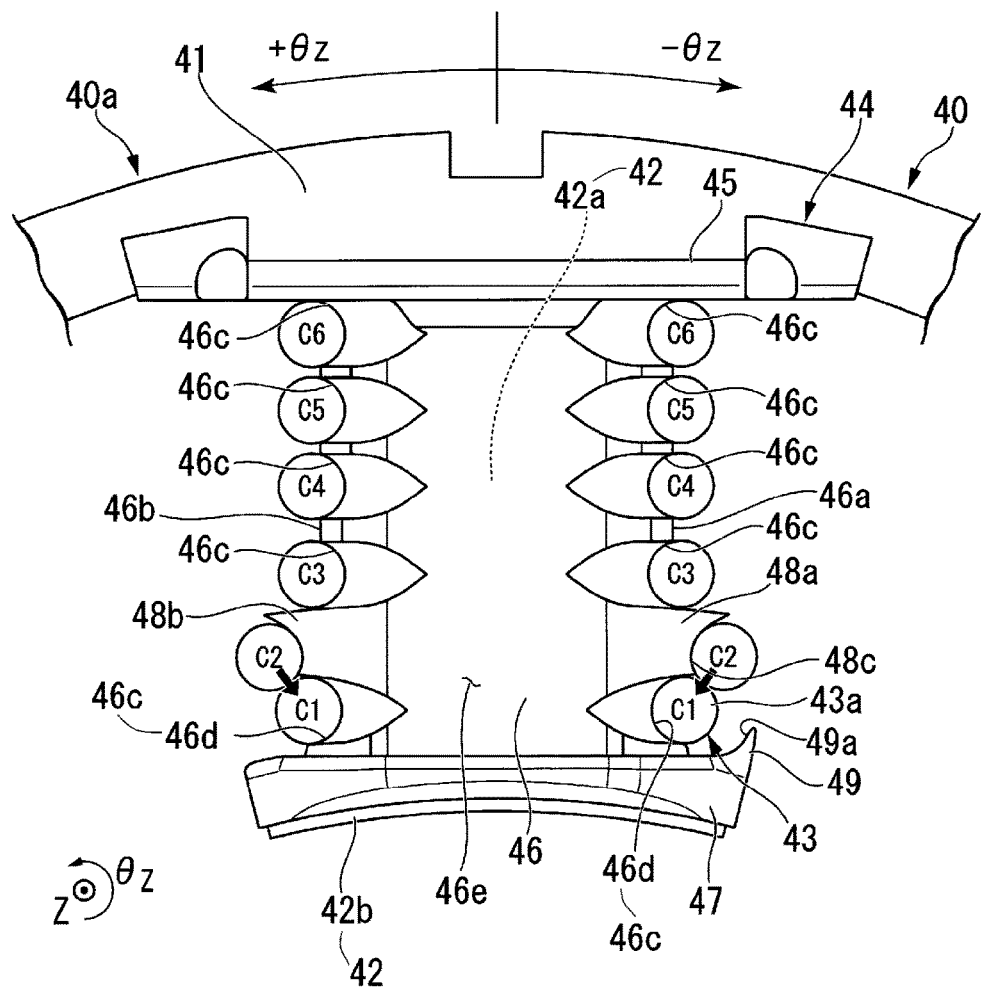
FIG. 5 is a plan view of part of the stator of the preferred embodiment.
Figure 6:
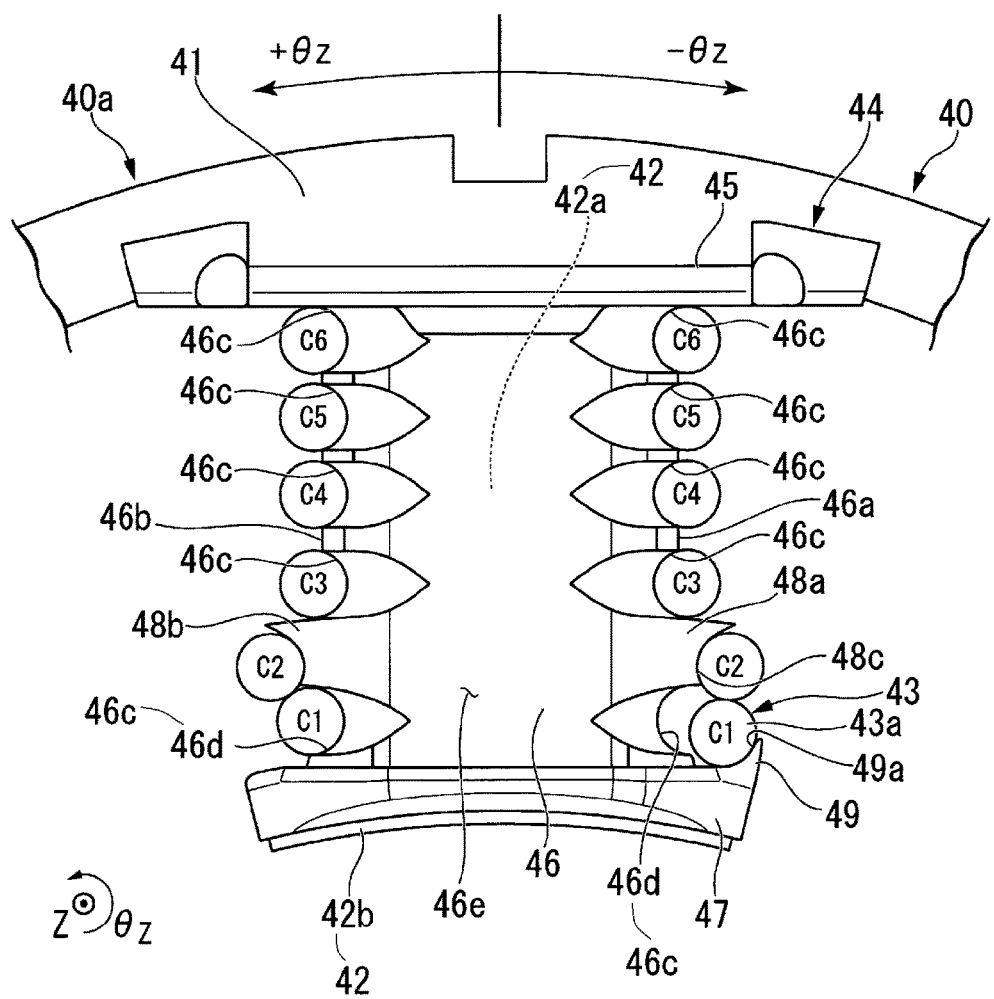
FIG. 6 is a plan view of part of the stator of the preferred embodiment.

The cylinder 46 is annular in the radial direction. As shown in FIG. 4, the extension 42a is disposed inside the cylinder 46. As shown in FIGS. 5 and 6, the conductive wire 43a is wound around the cylinder 46 to form the coil 43.

Cylinder outer side surfaces 46a and 46b are outer side surfaces of the cylinder 46 in both sides in the circumferential direction. The cylinder outer side surfaces 46a and 46b include a plurality of grooves 46c depressed toward the teeth 42. As shown in FIGS. 3 and 4, the groove 46c extends in the axis direction. The groove 46c extends from the upper end to the lower end of the cylinder outer side surfaces 46a and 46b. The grooves 46c are arranged along the radial direction.

As shown in FIGS. 5 and 6, a first groove 46d which is closest to the umbrella 47 amongst the grooves 46c is disposed in the proximity of the inner ends of the cylinder outer side surfaces 46a and 46b in the radial direction. The groove 46c which is most distant from the umbrella 47 amongst the grooves 46c is disposed in the outer end of the cylinder outer side surface 46a in the radial direction.

In the groove 46c, part of the conductive wire 43a wound around the cylinder 46 is disposed. In the preferred embodiment, the outer shape of the groove 46c in a plan view is substantially semicircular. The curvature of the outer shape of the groove 46c in a plan view is similar to the curvature of the cross-sectional shape of the conductive wire 43a, for example. Thus, the conductive wire 43a can be stably held in the groove 46c.

As shown in FIG. 3, the umbrella 47 is a plate disposed in the end of the cylinder 46 in the radial direction and extending in the both sides in the circumferential direction.

The umbrella 47 is disposed in the inner end of the cylinder 46 in the radial direction and extends in the both side in the axis direction. In the preferred embodiment, the shape of the umbrella 47 when being viewed in the radial direction is rectangularly annular. As shown in FIG. 4, the umbrella 47 covers at least part of the tip 42b. Note that the outer shape of the umbrella 47 may be a shape other than the above-described one.

As shown in FIG. 3, the plate 45 is a plate extending from the outer end of the cylinder 46 in the radial direction to the both sides in the circumferential direction and to the both sides in the axis direction. The shape of the plate 45 when being viewed in the radial direction is substantially rectangularly annular. As shown in FIGS. 5 and 6, detachment of the coil 43 in the radial direction can be prevented by the umbrella 47 and the plate 45. Note that the outer shape of the plate 45 may be a shape other than the above-described one.

The wall 48a protrudes in one side of the circumferential direction from the cylinder outer side surface 46a which is an outer side surface of the cylinder 46 in one side of the circumferential direction. The wall 48a is disposed outside the first groove 46d in the radial direction. That is, the first groove 46d is disposed between the wall 48a and the umbrella 47 in the radial direction. The wall 48a is adjacent to the first groove 46d.

The tip of the wall 48a is disposed, in the circumferential direction, closer to the cylinder 46 than is the end of the umbrella 47 in one side of the circumferential direction. At least part of the wall tip surface 48c is inclined and becomes closer to the cylinder 46 toward the umbrella 47 side in the radial direction (that is, inner side in the radial direction). The wall tip surface 48c is a curved surface depressed in the teeth 42 side.

The cylinder outer side surface 46b is an outer side surface of the cylinder 46 in the other side of the circumferential direction. The wall 48b protrudes from the cylinder outer side surface 46b to the other side of the circumferential direction. Other parts of the wall 48b are structured the same as the wall 48a.

The conductive wire 43a is wound from the inner end of the cylinder 46 in the radial direction to the outside of the radial direction. That is, the position of winding start of the coil 43 (conductive wire 43a) is the end of the cylinder 46 in the umbrella 47 side. The coil end of the winding start of the coil 43 is provided with one side of a first winding C1 in the circumferential direction. That is, the conductive wire 43a of the coil 43 is wound around the cylinder 46 at the inner end thereof in the radial direction from one side of the circumferential direction.

In FIGS. 5 and 6, the conductive wire 43a is wound around the cylinder 46 six times. The first winding C1 of the conductive wire 43a is wound around the cylinder 46 along the first groove 46d. A second winding C2 of the conductive wire 43a is wound around the walls 48a and 48b along the wall tip surface 48c. The second winding C2 contacts the first winding C1.

Third winding C3, fourth winding C4, fifth winding C5, and sixth winding C6 of the conductive wire 43a are wound around the cylinder 46 along the four grooves 46c disposed outside the walls 48a and 48b in the radial direction.

The second winding C2 wound around the walls 48a and 48b is pressed against the wall tip surface 48c when the conductive wire 43a is tightened. Since the wall tip surface 48c is inclined, the second winding C2 receives an inward force in the radial direction when being pressed against the wall tip surface 48c. Thus, as shown by bold arrows in FIG. 5, the second winding C2 applies a force inclined inward to the cylinder 46 side to the conductive wire 43a (first winding C1 of FIG. 5) inwardly adjacent to the second winding C2 in the radial direction.

Thus, the force pressing against the cylinder 46 is applied to the conductive wire 43a inwardly adjacent to the second winding C2 in the radial direction by the second winding C2. As a result, the conductive wire 43a inwardly adjacent to the second winding C2 in the radial direction can be fixed as being pressed against the cylinder 46 side by the second winding C2. Thus, a movement of the conductive wire 43a wound around the teeth 42 via the insulator 44 can be suppressed.

The first groove 46d is disposed between the walls 48a and 48b and the umbrella 47. Thus, the conductive wire 43a inwardly adjacent to the walls 48a and 48b in the radial direction is set as the first winding C1 disposed in the first groove 46d. Thus, detachment of the first winding C1 including the coil end initially wound in the coil 43 from the first groove 46d can be suppressed.

In the preferred embodiment, the walls 48a and 48b are outwardly adjacent to the first groove 46d in the radial direction. Thus, the second winding C2 contacts the first winding C1 and presses the first winding C1 to the cylinder 46 side. Thus, detachment of the first winding C1 from the first groove 46d can be suppressed. Thus, the detachment of the first winding C1 wound around the teeth 42 via the insulator 44 can be suppressed.

Since the initially-wound coil end of the coil 43 is easily moved, once the coil 43 is wound around the teeth 42, a process of bonding the initially-wound coil end to the busbar or the like may be difficult to perform in some cases. In contrast, since the first winding C1 including the initially-wound coil end is fixed by the conductive wire 43a (that is, second winding C2) wound around the walls 48a and 48b, the movement of the initially-wound coil end can be suppressed. Thus, the process of bonding the initially-wound coil end to the busbar or the like can easily be performed.

As described above, since the wall tip surface 48c is a curved surface, the second winding C2 wound around the walls 48a and 48b can be stably held with respect to the wall tip surface 48c. Thus, the detachment of the second winding C2 from the walls 48a and 48b can be suppressed. As a result, the first winding C1 is pressed by the second winding C2, and thus, the first winding C1 can be stably fixed. Thus, the detachment of the first winding C1 from the first groove 46d can be suppressed.

If the motor 10 is an inner rotor motor as in the preferred embodiment, the teeth 42 extend from the core back 41 inwardly in the radial direction. In that case, a gap between the teeth 42 in the circumferential direction becomes narrower toward the center of the radial direction. In order to fix the first winding C1 including the initially-wound coil end, the conductive wire 43a is wound inwardly in an overlapping manner in the radial direction. However, at the inner end in the radial direction, the gap between the teeth 42 in the circumferential direction is narrow, and thus, wrapping the conductive wire 43a around the teeth 42 in an overlapping manner is difficult.

In contrast, in the preferred embodiment, the first winding C1 including the initially-wound coil end of the coil 43 can be fixed without wrapping the conductive wire 43a in an overlapping manner in the radial direction.

The protrusion 49 protrudes from the end of the umbrella 47 in one side of the circumferential direction toward the core back 41 side. That is, the protrusion 49 and the wall 48a are disposed in the same side with respect to the cylinder 46.

If the first winding C1 is pressed by the second winding C2, the first winding C1 may possibly be pushed out of the first groove 46d by the second winding C2 depending on strength of the force tightening the second winding C2 with respect to the walls 48a and 48b or a way of contact between the first winding C1 and the second winding C2. In contrast, as shown in FIG. 6, even if the first winding C1 pushed out of the first groove 46d can be received by the protrusion 49. Thus, even if the first winding C1 is pushed out of the first groove 46d, the movement of the initially-wound coil end of the coil 43 caused by the detachment of the first winding C1 from the cylinder 46 can be suppressed.

In the present application, a state where the protrusion 49 protruding toward the core back 41 may indicate that the tip of the protrusion 49 is closer to the core back 41 than is a connection point of the protrusion 49 and the core back 41.

The first winding C1 received by the protrusion 49 is, for example, held and fixed by the second winding C2 and the protrusion 49 in the radial direction.

At least part of the protrusion 49 overlaps with the first groove 46d in the circumferential direction. Thus, the first winding C1 pushed out of the first groove 46d can easily be received by the protrusion 49. Thus, the movement of the initially-wound coil end of the coil 43 caused by the detachment of the first winding C1 from the cylinder 46 can further be suppressed.

A gap between the tip of the protrusion 49 and the second winding C2 is less than the diameter of the conductive wire 43a. Thus, the first winding C1 pushed out from the gap between the protrusion 49 and the second winding C2 to be apart from the cylinder 46 can be prevented. Thus, the movement of the first winding C1 from the teeth 42 can be prevented.

In FIGS. 5 and 6, the shape of the protrusion 49 in a plan view is a triangle. The shape of the protrusion 49 in a plan view is not specifically limited, and it may be semi-circular, semi-ellipse, or polygonal. A protrusion inner side surface 49a is a surface of the protrusion 49 facing the cylinder 46 in the circumferential direction (surface in the other side of the circumferential direction), and is a curved surface depressed in one side of the circumferential direction. Thus, as shown in FIG. 6, if the first winding C1 is pushed out of the first groove 46d and received by the protrusion 49, the first winding C1 can be stable held by the protrusion inner side surface 49a. Thus, even if the first winding C1 is pushed out of the first groove 46d, the first winding C1 can be stably fixed.

As shown in FIGS. 3 and 4, the protrusion 49 extends in the axis direction. The upper end of the protrusion 49 is disposed above the cylinder upper surface 46e which is the upper end of the cylinder 46. The lower end of the protrusion 49 is disposed below the cylinder upper surface 46e. Thus, the first winding C1 wound around the cylinder 46 can be received by the protrusion 49 more effectively.

The upper end of the protrusion 49 and the upper end of the umbrella 47 are disposed in substantially the same position in the axis direction. The lower end of the protrusion 49 is disposed between the upper end and the lower end of the cylinder 46 in the axis direction.

As shown in FIG. 3, the insulator 44 includes an upper piece 44b and a lower piece 44c. The upper piece 44b and the lower piece 44c are different members. The upper piece 44b is the upper part of the insulator 44 and the lower piece 44c is the lower part of the insulator 44. The protrusion 49 is only provided with the upper piece 44b. The insulators 44 may be a single member, for example.

In the preferred embodiment, with respect to all insulators 44, each of the wall 48a and the protrusion 49 is disposed in the same side with respect to the cylinder 46 in the circumferential direction. That is, in all teeth 42, each of the wall 48a and the protrusion 49 is disposed in the same side with respect to the cylinder 46 in the circumferential direction. Thus, if the coil 43 is wound around each of the teeth 42 in the same manner, the first winding C1 can be fixed in each of the teeth 42. As a result, the detachment of the first winding C1 from the teeth 42 can be suppressed.

The present disclosure is not limited to the above preferred embodiment and can adopt other structures.

The conductive wire 43a may be wound around the walls 48a and 48b at any round. For example, the conductive wire 43a may be wound around the walls 48a and 48b at any one of third winding C3 to sixth rounds C6. In that case, the first winding C1 is pressed and fixed by the winding of the conductive wire 43a wound around the walls 48a and 48b.

The walls 48a and 48b are not necessarily prepared both, and only the wall 48a may be provided. The wall tip surface 48c may be inclined entirely. The wall tip surface 48c may be a flat surface.

A plurality of protrusions 49 may be provided with a single umbrella 47. The protrusions 49 may be provided with the both sides of the umbrella 47 in the circumferential direction. In that case, even if the coil 43 is wound around the teeth 42 from any side of the circumferential direction, the detachment of the first winding C1 from the teeth 42 can be suppressed.

The above-described structures can be applied to a case where the motor 10 is an outer rotor motor, for example.

The protrusion 49 may extend from the upper end to the lower end of the umbrella 47. The protrusion inner side surface 49a may be a flat surface.

The number of rotor core in the rotor 30 may be one.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator comprising:
    a core back having an annular shape extending in a circumferential direction around a central axis extending in the vertical direction;
    a plurality of teeth extending from the core back in a radial direction;
    a plurality of insulators covering at least part of the teeth; and
    a coil formed of a conductive wire wound around the teeth via the insulators,
    wherein the insulator includes,
        a cylinder having a cylindrical shape extending in the radial direction,
        an umbrella disposed at an end of the cylinder in the radial direction and extending in both sides of the circumferential direction, and
        a first wall protruding from a first outer side surface of the cylinder to one side of the circumferential direction,
        a second wall protruding from a second outer side surface of the cylinder to a second side of the circumferential direction, and
    wherein at least part of a tip surface of each of the first and second walls is inclined and approaches closer to the cylinder as it moves toward the umbrella in the radial direction, and
    wherein the insulator includes at least one protrusion protruding to the core back side from the end of the umbrella in one side of the circumferential direction,
    a first winding including a winding start of the coil, wherein a position of the first winding is at the umbrella end of the cylinder, and
    a second winding wound around the first and second walls and at least partially overlaps the first winding in the radial direction and the circumferential direction.

2. The stator of claim 1, wherein the first and second outer side surfaces of the cylinder each include a plurality of grooves extending in an axis direction and depressed toward the teeth, and
    the plurality of grooves are arranged along the radial direction, and
    a first groove of the plurality of grooves which is closest to the umbrella is disposed between the wall and the umbrella in the radial direction.

3. The stator of claim 2, wherein at least part of the protrusion overlaps with the first groove in the circumferential direction.

4. The stator of claim 1, wherein the tip surface of each of the first and second walls is a curved surface depressed in the teeth side.

5. The stator of claim 1, wherein each of the first and second walls and the protrusion is, in all of the teeth, provided with the same side in the circumferential direction with respect to the cylinder.

6. The stator of claim 1, wherein an upper end of the protrusion is disposed above an upper end of the cylinder, and a lower end of the protrusion is disposed below an upper end of the cylinder.

7. The stator of claim 1, wherein a surface of the protrusion toward the cylinder in the circumferential direction is a curved surface depressed in one side of the circumferential direction.

8. The stator of claim 1, wherein the teeth extend to the inside from the inner side surface of the core back in the radial direction.

9. A motor comprising: a stator of claim 1; and
   a rotor that is rotatable relative to rotate in relation to the stator.

10. The stator of claim 1, wherein the second winding contacts the tip surface of the first and second walls.

11. The stator of claim 10, wherein the second winding further contacts the first winding.

12. The stator of claim 1, wherein a gap between a tip of the protrusion and the second winding is less than the diameter of the conductive wire.

* * * * *